US008864462B2

(12) United States Patent
Mayda et al.

(10) Patent No.: US 8,864,462 B2

(45) Date of Patent: Oct. 21, 2014

(54) WIND TURBINE LOAD MITIGATION DEVICE AND PORT CONFIGURATION

(75) Inventors: Edward A. Mayda, Lafayette, CO (US); Jonathon P. Baker, Davis, CA (US); Leigh Zalusky, Vacaville, CA (US); Thomas Jay Green, Roseville, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 637 days.

(21) Appl. No.: 13/072,015

(22) Filed: Mar. 25, 2011

(65) Prior Publication Data

US 2012/0243989 A1 Sep. 27, 2012

(51) Int. Cl.
*F03D 7/04* (2006.01)
*F03D 11/00* (2006.01)

(52) U.S. Cl.
CPC ......... *F03D 11/0091* (2013.01); *F05B 2270/80* (2013.01); *Y02E 10/722* (2013.01); *F03D 11/0025* (2013.01)
USPC ... 416/1; 416/23; 416/42; 416/61; 416/146 R

(58) Field of Classification Search
USPC ................... 416/23, 39, 42, 61, 146 R, 236 R
See application file for complete search history.

(56) References Cited

U.S. PATENT DOCUMENTS 8,321,062 B2 * 11/2012 Nies et al. ..................... 700/287
2009/0285682 A1 11/2009 Baker et al.
2011/0229320 A1 * 9/2011 Hancock et al. .................. 416/1

OTHER PUBLICATIONS

Office Action issued in corresponding U.S. Appl. No. 13/071,953. mailed Oct. 25, 2013.

* cited by examiner

*Primary Examiner* — Edward Look
*Assistant Examiner* — Juan G Flores
(74) *Attorney, Agent, or Firm* — Banner & Witcoff, Ltd.

(57) ABSTRACT

An active sensing system for wind turbines is described. The sensing system may include a plurality of ports, a local sensing device and a load mitigation device and may be operably coupled to a control system. The plurality of ports, local sensing device, and load mitigation device may be operably coupled and configured to monitor air pressure on wind turbine blades, determine if proper sensing operation is occurring, and eradicate an obstruction if proper sensing operation is being prevented by the obstruction. Associated methods performing the sensing and eradication of the obstruction including purging and deicing are disclosed. Wind turbines and wind turbine blades with the active sensing system are also described.

18 Claims, 12 Drawing Sheets

10A
110
120
105
130
110
150
10B
10C
101
170
160
175

WIND TURBINE LOAD MITIGATION DEVICE AND PORT CONFIGURATION

FIELD OF THE INVENTION

The invention relates generally to wind turbines. More specifically, the invention relates to wind turbine load mitigation devices and port configuration.

BACKGROUND

Wind turbines are known. They are renewable energy devices that may provide energy with minimal to zero environmental affects. Global energy demand continues to increase as a result of continued industrialization and population increase. Likewise, environmental concerns also continue to play more significant roles in economies and industries across the globe including concerns relating to air quality, draining of natural resources, and global warming, to name a few. Accordingly, innovation relating to renewable energy methods and devices and wind turbines in particular is of significant interest, importance and attention. Wind turbines and methods of operating, maintaining, controlling and otherwise using wind turbines are of significant interest and research as they relate to energy production and consumption as well as the preservation of the environment and other natural resources. Wind turbines may be utilized in varied climates and are exposed to various elements including extreme temperatures, precipitation including snow, sleet, freezing rain, and hail, and other environmental factors. Features of the wind turbines may be able to minimize the effect of the elements and help reduce any frequency with which wind turbines need maintenance or experience stoppage due to weather.

BRIEF SUMMARY

To overcome limitations in the prior art described above, and to overcome other limitations that will be apparent upon reading and understanding the present specification, the present invention is directed to wind turbines and wind turbine repair.

A first aspect of the disclosure provides a sensing module for a wind turbine blade a plurality of ports, a local sensing device, and a load mitigation device. The plurality of ports, local sensing device, and load mitigation device are operably coupled and configured to be operably coupled to a control module. When coupled to the control module the sensing module is able to monitor air pressure, determine if proper sensing operation is occurring, and to eradicate an obstruction if proper sensing operation is being prevented by the obstruction. The sensing module may actively eradicate an obstruction by supplying air or heat in a variety of manners. For example, air may be supplied from a dry air supply in the hub and dispensed locally at the port. Heat may be applied locally from a heater housed in the port.

A second aspect of the disclosure provides a wind turbine with a plurality of blades that includes a sensing system. In at least one configuration, the sensing system may be configured to monitor air pressure on the turbine blades including a plurality of sensor modules being housed in each turbine blade and a control module housed in the hub. The sensor modules each may include a plurality of pressure ports, a local sensing device and a load mitigation device. The control module may include a master controller and a dry air system and other components and structures. The sensing system in at least some configuration may be considered an active sensing system configured to determine if proper sensing operation is being prevented and to take action to eradicate an obstruction that is preventing proper sensing operation from the wind turbine.

A third aspect of the disclosure provides a method for monitoring wind turbine blade operation with an active sensing system monitoring operational characteristics of a turbine blade. In at least one configuration, wind turbine monitoring of turbine blade operation may include detection of air pressure on a surface of a turbine blade by detecting differences in air pressure measure at a first and a second pressure ports of a complimentary pair of pressure ports housed and spaced on the turbine blade. As a result of obstructions from debris or icing or the like, the system may detect and determine occurrence of an error in monitoring of the operational characteristics of the turbine blade. The system may then take action to perform an eradicating action to eradicate a portion of an obstruction on the turbine blade. For example, pressurize air or heat may be supplied to the region of believe obstruction or error to remove the obstruction.

Other aspects of the invention include variations and configurations of wind turbines and methods for servicing wind turbines as are described herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Wind turbines create power proportional to the swept area of their blades. Increasing the length of a wind turbine's blades increases the swept area. Accordingly, more power can be produced or captured. A wind turbine's generator, gears, bearings, and support structure are typically designed around the expected wind load and power production characteristics. At low wind speeds very long blades are desirable to get as much power as possible out of the available wind. At high wind speeds a wind turbine must control the power production and the mechanical loads developed so as to prevent breaks, cracks and other destruction to the wind turbine. Eventually, if the wind speeds become high enough, the turbine must shut down to avoid damaging components, so short blades are desirable to keep the turbine producing power in high winds.

The choice of a rotor diameter for a wind turbine is a design trade-off between energy production in low winds and load limitation in high winds. Wind turbine manufacturers often sell a variety of rotor sizes for a given wind turbine model. The rotor sizes are optimized for sites that have a low, medium, or high annual average wind speed. The rotor size selected is always a compromise, and there are conditions in which the turbine does not perform optimally because the rotor is too big or too small. Typical wind speeds and standard deviation (max and min wind speeds) at given locations worldwide are generally known. This information is often seen in charts or graphs. For example, various charts and graphs illustrating wind speeds across the United States are known and may be helpful to wind turbine designers in designing wind turbines for a given location in the United States or elsewhere across the globe.

Wind turbines may generally be characterized as having either fixed length or variable length blades. As suggested by the name, fixed length wind turbine blades have a fixed length and lack an extendable tip that provides the variable length aspect of the variable turbine blades. Variable length wind turbine blade allows for a large diameter in low winds and a small diameter in high winds. This is accomplished by having a root portion and a tip portion of the blades. The tip portion may be extended or retracted, depending on the amount of wind present. Fixed and variable length wind turbines and wind turbine blades are well known in the art. Among the companies known to provide fixed and variable length wind turbines and turbine blades is Frontier Wind.

Figure 1:
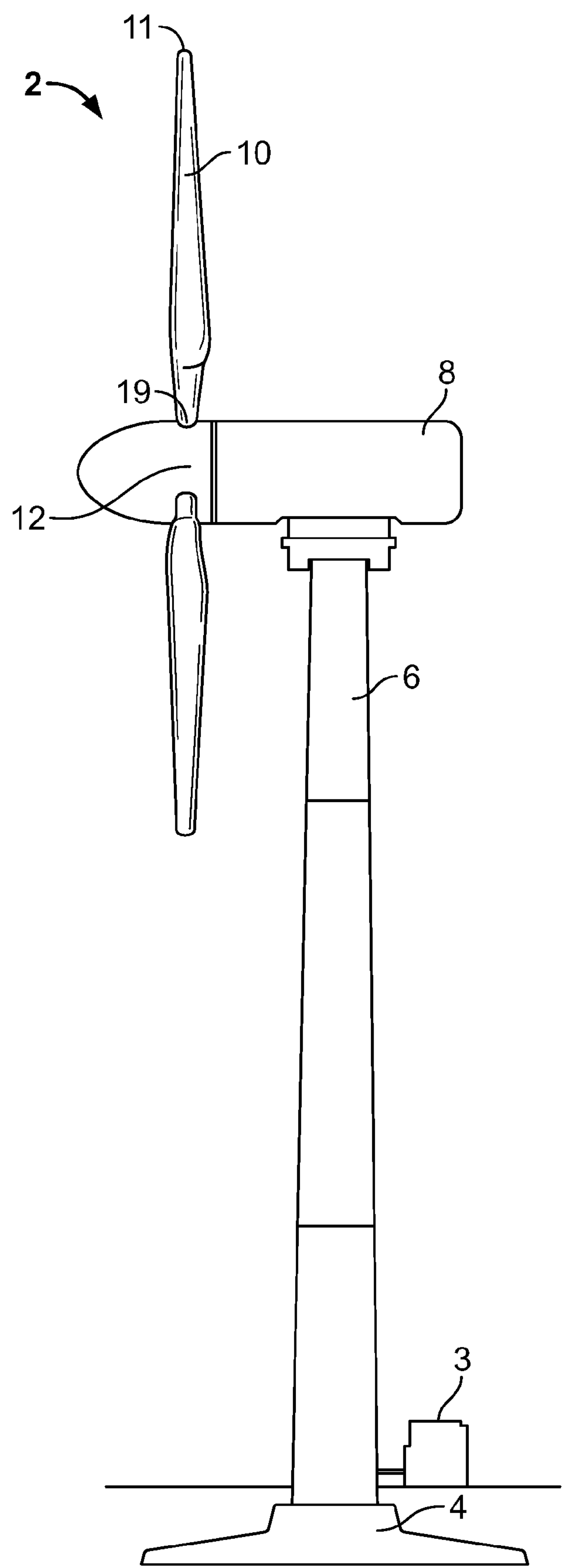
FIG. 1 is an illustrative schematic view of a wind turbine.

FIG. 1 illustrates an example of a general arrangement of a wind turbine 2 and an associated transformer 3. For clarity and understanding, the wind turbine shown in FIG. 1 may generally be referred to as a fixed length blade wind turbine 2. The wind turbine 2 illustratively shown in FIG. 1 includes a variety of components known in the art with respect to wind turbines. Several turbine blades 10 are configured about a turbine hub 12 and are caused, depending on wind characteristics, to rotate about the turbine hub 12 thereby rotating one or more shafts or similar force transfer elements and components housed in the wind turbine 2. Blades 10, regardless of whether they are fixed or variable length, may generally be described as having a blade tip 11 and a blade root 19. The blade tip refers to the angularly outward end or region of the blade as seen in FIG. 1. The blade root may generally be described as an end or region opposing the blade tip 11. As such, the blade root 19 is the angularly inward most region of the blade 10 and attaches to the turbine hub 12. The nacelle 8 often houses a variety of components for capturing, redirecting and/or utilizing the wind so as to generate power for eventual use and distribution including brakes, various shafts, gears, gearboxes, generators and various other components known in the art. As shown, nacelle 8 may sit on a tower 6 which may have a variety of desired characteristics often supports the power generating/harnessing portions of the wind turbine including for example the nacelle 8, the turbine hub 12 and the turbine blades 10 as well as other related components vertically above a reference surface. Tower 6 may be supported by foundation 4. Various components may be housed in the nacelle 8 and these components may include numerous variations and configurations known in the art. In operation, turbine hub 12 is rotated as a result of forces from the wind being applied to the turbine blades 10 (e.g. lift force). This force is transferred through the shown components of the nacelle 8 to a generator where it is converted from rotational (kinetic) energy to electrical energy. While FIG. 1 illustratively depicts a fixed length blade length wind turbine it is easily appreciated by those skilled in the art that the port purging and deicing and related systems, devices and components are applicable to wind turbines generally regardless of which category of blades of a particular wind turbine.

The rotor blades as shown in FIG. 1 may be formed of any of a variety of suitable materials known to be used in the art. For example, rotor blades on large wind turbines are often made of glass fiber reinforced plastics (GRP), i.e. glass fiber reinforced polyester or epoxy. Reinforcing materials such as carbon fiber or aramid may also be used in rotor blades in certain instances. Steel and aluminum alloys may also be used for rotor blades especially small wind turbines. Wood, wood-epoxy or wood-fiber-epoxy composites also may be utilized. Various other materials may be used for the rotor blades as is known in the art.

Safe, productive and efficient operation of wind turbines often includes monitoring systems and/or devices to monitor among other characteristics stresses, air pressures, energy production, wind speed, rotation speed and various other characteristics well known in the art. The pressure on the surface of the wind turbine blades is a characteristic that is typically monitored to prevent damage or destruction to wind turbine blades due to environmental effects including wind speeds at extremes and other natural effects that act on the wind turbine blades during operation. Wind turbines may be equipped with sensing and monitoring systems to provide data and feedback regarding the operation of the wind turbine. This data and feedback may provide insight into the state of the wind turbine and the various stresses the wind turbine may be operating under at certain points in time.

The conditions on the surface of wind turbine blades provide insight into the forces being applied on the blade and provide insight and facilitate prediction of potential failures and enable entities and personnel controlling the operation of wind turbines to alter the particular operation to prevent damage, fatigue or failure. To determine conditions locally at the wind turbine, sensing systems including sensors may be housed in the turbine blade and the remainder of the wind turbine. In certain instances the sensing components including ports on the surface of the wind turbine blade may begin to fail to operate correctly as they may be clogged including potentially being covered with ice or other debris. As such, the present system in various arrangements may be configured to detect failure of sensing components and be able to react to free debris or to heat ice so as to permit the sensing components to resume normal operation and to again provide feedback and data to the system.

For example, in various arrangements the disclosed system is configured to be able to detect failed or improper readings from components utilized for determining proper operating conditions. The system may be configured to provide removal of moisture, debris and ice from air deflectors and/or pressure sensing ports in a wind turbine using air including pressurized air, heating elements and like elements as understood by one skilled in the art. For example, in at least one configuration a resistive heating element is coiled around a port tube so as to prevent ice formation. The resistive heating element may serve multiple purposes including melting ice and determining temperature. The system may be configured to also be able to take actions to remedy the improper conditions. For example, upon a determination of failed or improper readings the system may be able to take action by supplying high pressure air to ports to dislodge debris that may be preventing proper operation of the ports and other sensing components. Likewise, the system may also or alternatively be configured to heat ice that may have formed over ports on the turbine blade so as to fix errors or improper operation and return the system to proper functioning and operation. As such, the system may be configured to perform purging and/or deicing utilizing high pressure air and/or heat supplied from a heater to eradicate moisture, ice, debris and other problematic foreign objects that may obstruct sensing, monitoring, operation or the like with respect to wind turbines and blades themselves.

Figure 2:
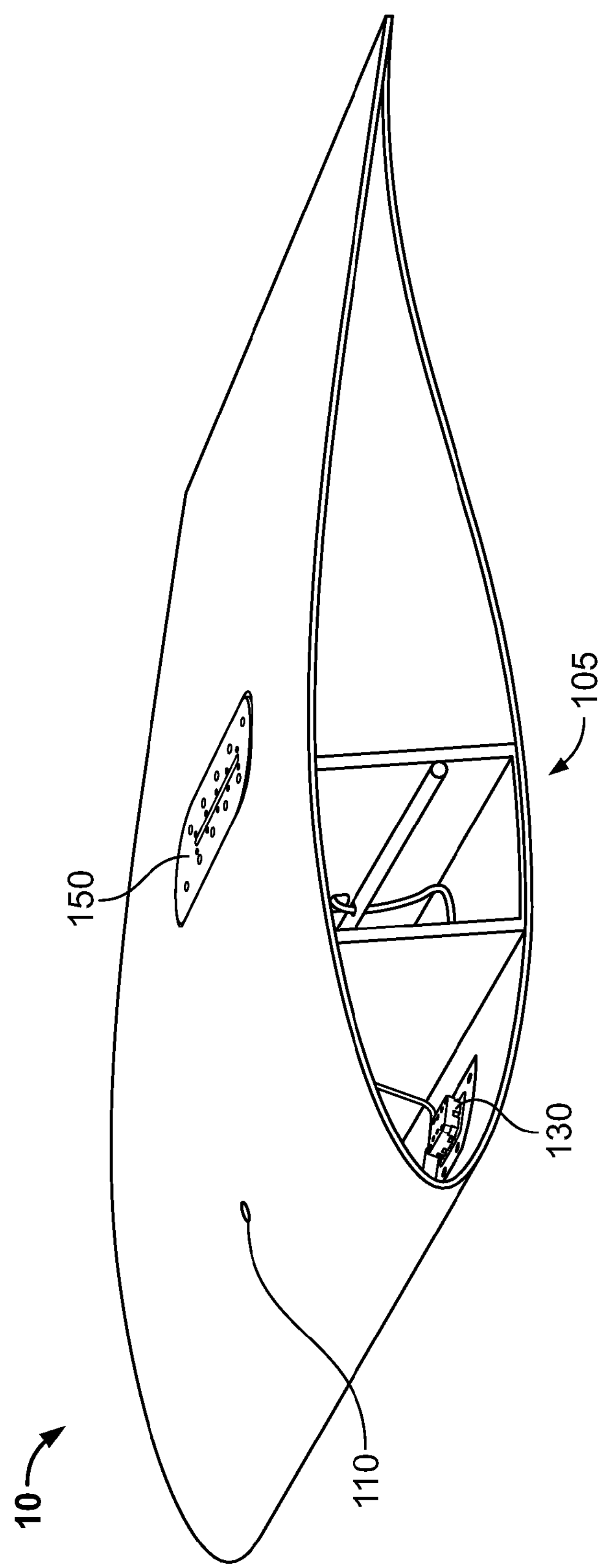
FIG. 2 is an illustrative perspective view of a cut-away region a turbine blade.
Figure 3:
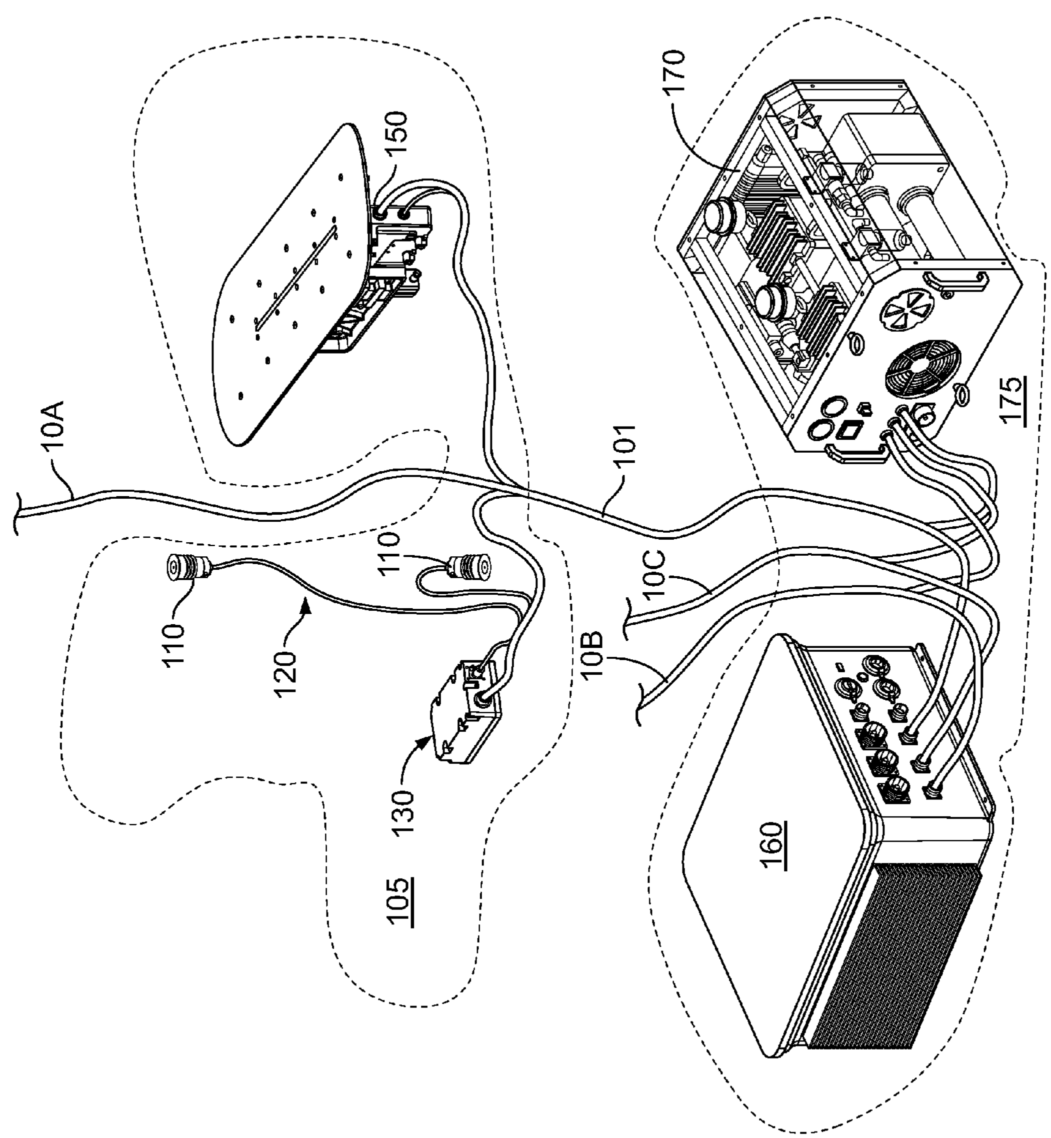
FIG. 3 is an illustrative schematic view of a sensing system of a wind turbine.

FIG. 2 is an illustrative perspective cut-away view of a section of turbine blade 10 that provides an exposed view of the interior of the blade 15. The illustrated turbine 2 and turbine blade 10 are depicted as having various systems and devices included in the wind turbine. FIG. 3 provides an illustrative schematic of the sensing system 100 for a wind turbine. The sensing system 100 in at least one configuration as illustratively depicted in FIG. 3 may include components housed in each of the turbine blades 10 and components that are housed in the hub 12 or elsewhere in the turbine 2. Generally, a plurality of pressure ports 110, local sensing devices 130, and load mitigation devices 150 (with air deflection member 155 in a retracted position and thus not shown) may be housed in a turbine blade 10. These components may be housed in each of the blades of the wind turbine and may be operably coupled to further components housed in the wind turbine of which there may be only one of in each wind turbine. For example, as shown in FIG. 3 there may be only a single master controller 160 and a single dry air system 170 in the hub of each wind turbine, these components being operably coupled to the pressure ports 110, local sensing devices 130 and load mitigation devices 150 in each of the turbine blades 10. Together each operably coupled grouping of two pressure ports 110, local sensing device 130 and load mitigation device 150 may be referred to for convenience and ease of reference as a sensing module 105. Likewise master controller 160 and dry air system together may be referred to for convenience and ease of understanding as the control module 175.

Each of the turbine blades (10A, 10B, 10C each represents an individual turbine blade) may include numerous sensing modules 105 each including a plurality of pressure ports 110, local sensing devices 130 and load mitigation devices or air deflectors 150. An illustrative example of a turbine blade 10 that may include for example ten (10) sensing modules may then also include ten (10) pairs of pressure ports (20 total), ten (10) local sensing devices, and ten (10) load mitigation devices 150. Sensing modules may be housed in the turbine blade 10 in a variety of particular locations and numbers. The sensing modules 105 may also be configured to cover various portions of the blade span and in certain configurations may be formed to cover various regions of the blade and in at least one configuration may cover the blade from the 60-95% span of the blade moving from the blade root 19 to the blade tip 11. However, sensing modules may be positioned further towards the blade root 19 and even the entire length of the blade 10 if desired. Varied configurations may be constructed as known by those skilled in the art.

Pressure ports 110 are typically housed at the surface of the blade and provide an orifice through which pressure at the surface of the blade may be determined. The pressure ports 110 operate in pairs and may be located or spaced on the turbine blade to facilitate operation such that the local sensing device 130 is able to measure a difference or variance in air pressure. For example, one port 110 of each pair of pressure ports 120 may be housed on the suction or downwind side and the other may be housed on the pressure or upwind side. (FIG. 2 shows one port 110 of the pair housed in the turbine blade 10 and the second pressure port of the pair is not visible but housed on the opposing bottom side) Also the pressure ports 110 may be positioned to run down the length of the blade in regions desired to be monitored. While that location may be varied as desired, one illustrative span of monitoring may be the 60%-95% blade length span moving from the blade root 19 to blade tip 11. Other variations are contemplated.

Figure 12:
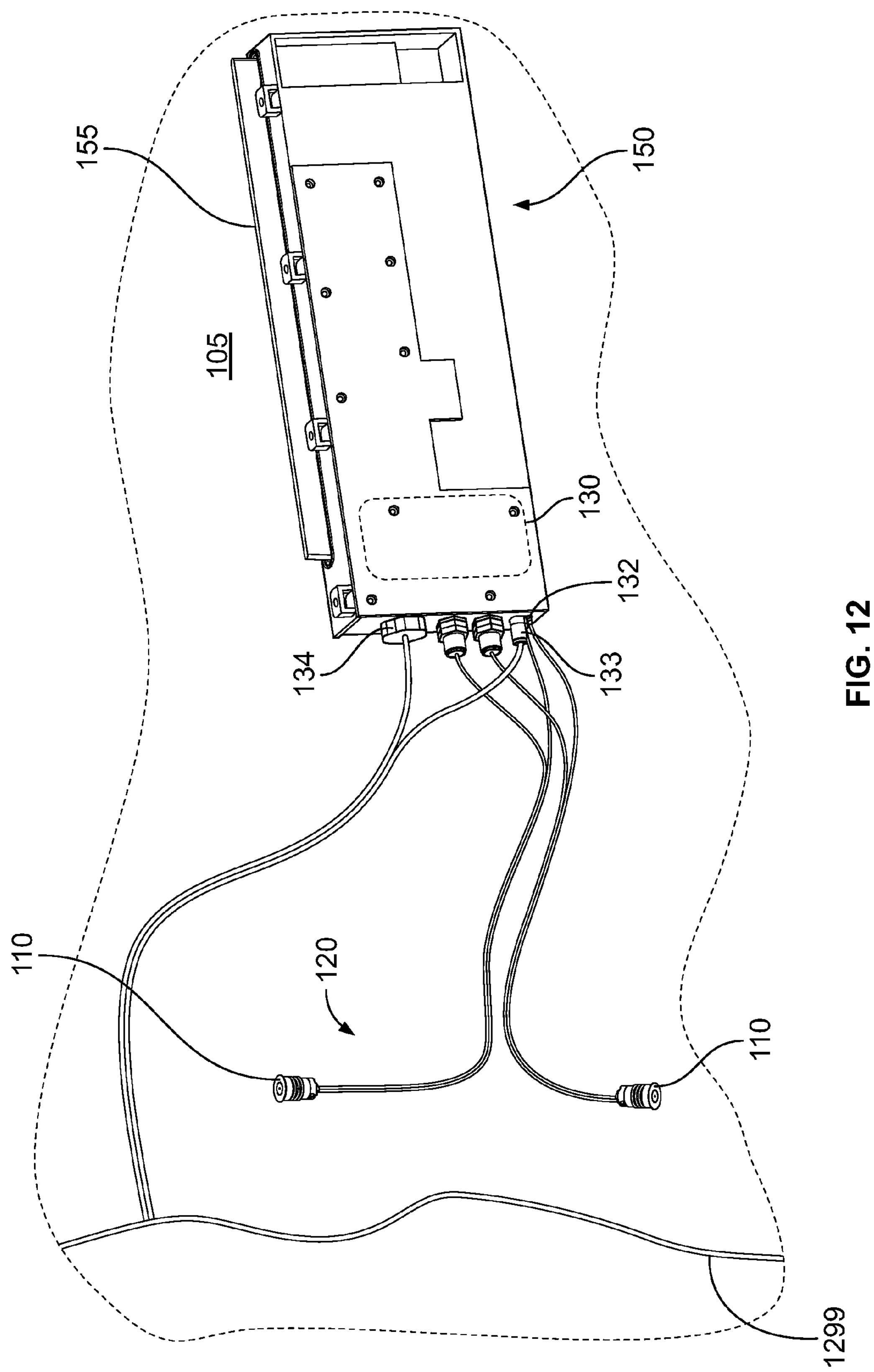
FIG. 12 is an illustrative schematic view of a sensing module with a load mitigation device with an integral local sensing device.

Each pair of pressure ports 120 are operably coupled to a local sensing device 130 and further on to both master controller 160 and dry air system 170 housed within the turbine hub 12 as shown in the schematic FIG. 3. Each pair of pressure ports 120 may be operably coupled to a local sensing device which may be housed as an independent component as illustrated in FIG. 3 or may be integrally formed into other components such as a load mitigation device 150 or other structures housed in a turbine blade 10. The load mitigation device 150 among other things may provide vibration dampening including mechanized vibration dampening for wind turbines blades. In particular the load mitigation device distributes the absorption effects of unwanted vibrations including those caused by winds. An illustrative example of a load mitigation device 150 may be a GustBuster® by Frontier Wind. These load mitigation devices or air deflectors may be activated so as to mitigate or reduce the load on the turbine blade by altering the air flow and thus force on the turbine blade. In at least one configuration a deflection member 155 is protruded from the load mitigation device 150 thereby causing air to flow around the deflection member and reducing the force on the turbine blade 10. A load mitigation device 150 in at least one configuration such as the deployable air deflector 150 shown for example in various figures including FIG. 12, is an apparatus and system for compensating for various load situations in a turbine includes the use of one or more deployable devices configured to extend an air deflector outwardly from a surface of a rotor blade. The air deflection member 155 disrupts the attached air flow on the surface of the turbine blade 10, reducing local lift without a significant increase in drag, resulting in a net decrease in blade loading. The load sensing technology enabled by the ports described herein may be used to control the GustBuster® or other load mitigation devices 150, which can react much more quickly than the blade pitch system and reduce maximum and fatigue loading on wind turbine components, thereby extending their useful lifetime. The air deflection member 155 may subsequently be retracted into the rotor blade 10 once the load falls below a certain threshold. Mechanisms for extending and retracting the air deflector may include pneumatic, hydraulic and/or electromechanical devices. Air deflectors 150 are generally configured to modify the air flow around the rotor blade 10 to increase or decrease power generation, or reduce loads so that the risk of potential damage to components of the wind turbine is minimized. Air deflectors 150 with extendable and retractable air deflection members 155 may be positioned at various chordwise stations including leading-edge, midchord, and trailing-edge locations on the upper and lower surfaces at spanwise positions. Accordingly, a plurality of devices can be actuated to aerodynamically control rotor performance and loads based on wind conditions.

As mentioned, the sensing module 105 which is typically housed in the turbine blade 10 is operably coupled to the control module 175 which is typically housed within the hub 12 of the wind turbine. In the configuration illustrative depicted in schematic FIG. 3, the control module includes a master controller 160 and a dry air system 170. Various other further features and structures may be housed in the hub as is well known to those skilled in the art including various mechanisms relating to movement and energy collection and transfer of the wind turbine. The master controller 160 may serve as a main controller for controlling operation of the sensing system and to further control and coordinate purging and deicing operations of individual wind turbine blades and the wind turbine as a whole. The dry air system 170 may serve as a source of dry air including pressurized dry air utilized in purging of the ports 110 and other portions of the turbine blade 10. While it is preferable that a single dry air system as shown may be utilized to supply each of the respective turbine blades 10—multiple dry air systems could also be utilized. The dry air system 170 may be coordinated by and along with master controller 160 to provide the requisite dry air in an efficient manner as indicated and needed by the respective turbine blades and ports at the particular local sensing modules 105 and at particular ports 110. For example, the pressure values of the pressurized air being supplied may be varied as may the frequency with the air is supplied to a particular port. Likewise, the pressurized air may be supplied in pulses to further facilitate purging effectiveness.

In at least one configuration the dry air system 170 is housed in the hub and rotates as the turbine blades 10 are rotated. As such, conventional dry air supplies are ineffective as conventional dry air supplies include compressors that include oil which leaks out of the compressor when the dry air supply is rotated during turbine operation. Likewise, gravity drain dry air supplies typically rely on gravity to drain water out of the dry air supply. They often include a trap. In one configuration contemplated herein the dry air supply 170 traps the water in the trap and when the compressor is run—air tanks in a dry air supply are charged up and utilized to purge the trap(s) filled with water by porting the water out a heated outlet port. As such, in one configuration the dry air supply 170 can effectively be rotated and operated.

The dry air supply 170 contains an oil-less compressor, as well as filter elements, a moisture separator, and a regenerative desiccant dryer to supply clean dry air to the pressure ports for purging. If the dry air supply is housed in the hub and rotates, bulk moisture that would normally drain by gravity from the moisture separator may be carried over into the dryer. A moisture trap is installed to prevent this. Offset inlet and outlet tubes in the moisture trap prevent passage of water into the dryer, and each time the system cycles off the water in the moisture trap is blown out through holes located around the circumference of the moisture trap. Tubing from these holes leads to a outlet drain, which is heated to prevent ice buildup and subsequent blockage of the drain. The dryer is a heatless desiccant type with two desiccant columns. While one of the columns is aligned with flow from the compressor to the accumulator/point-of-use, the second column has a small amount of air from the outlet of the on-line column flowing through it to atmosphere, removing the moisture that has collected in the desiccant. The columns are automatically switched periodically.

The master controller 160 may be a PC-based controller running a real time operating system, and performs a number of functions, including: collection of sensor data for analysis and control use; communication with system components for health monitoring and control purposes; calculation of local blade loading from pressure port data and comparison with blade load estimates based on operating conditions; determination of need for, and degree of, response from the load mitigating devices 150 to reduce maximum and fatigue loading of blades and other turbine components due to transient wind conditions.

Figure 4:
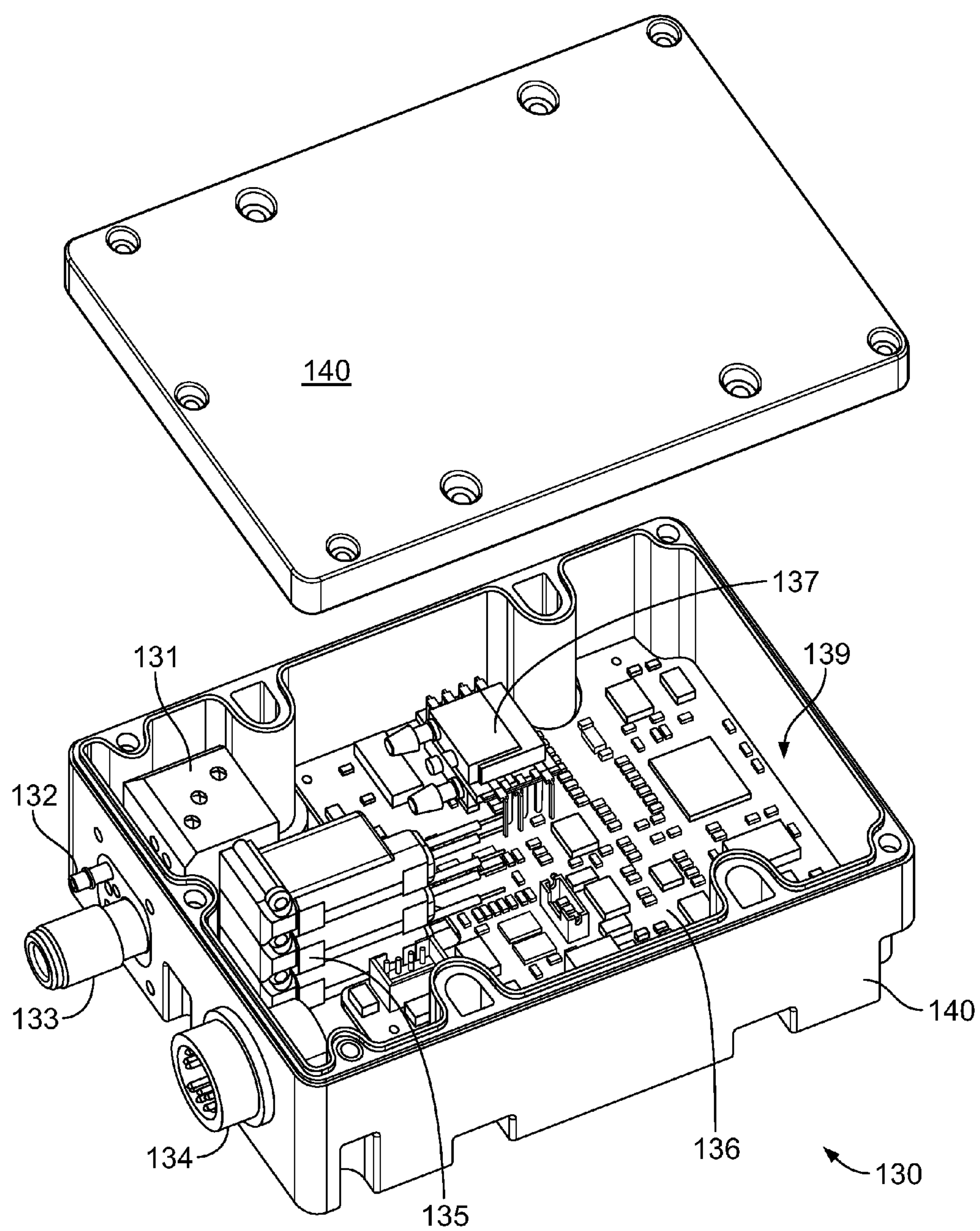
FIG. 4 is an illustrative exploded view of a local sensing device and components.

FIG. 4 is an illustrative exploded view of one configuration of a local sensing device 130 and components. One skilled in the art readily recognizes that the local sensing device 130 may possess numerous configurations and arrangements consistent with that described herein. In the configuration of FIG. 4, the components of the local sensing device 130 are housed in a case 140—shown here with a removable top. Within the interior region 139 of case 140 various components are operably connected together and also housed on printed circuit board (PCB) 136. At one end of the case 140 are port tubing barb connector 132, input pneumatic pressure connector 133, and electrical connector 134 which serve as connectors operably coupling pneumatic tubing and electronic wiring from the remainder of the system as illustratively shown in FIG. 2 so as to allow the local sensing device to perform air pressure and related sensing at the ports and to send local observation conditions and to receive control commands from the control module 175 including master control module 160. Internally, in this configuration the local sensing device 130 includes a purge manifold 131, purge valves 135, and pressure sensor 137.

While the components of the local sensing device 130 is shown as a unique physical component in FIG. 4, in other configurations the components of the local sensing device 130 or like arrangements of components may be integrally housed or otherwise placed, for example as part of the load mitigation device 150. In such an instance, the components of the local sensing device 130 may be integrated into the other system and integrated into the circuitry and components of the other components of the system.

The local sensing device 130 may have a variety of various configurations including a stand alone controller or as one or a group of components housed with or in another device including a load mitigation device 150. One skilled in the art will recognize the local sensing device 130 may take a variety of configurations and appearances to accomplish a variety of functionality consistent with that described herein. Local sensing devices 130 may serve a variety of functions and/or perform a variety of processes some of which are illustratively listed below.

One illustrative function may be to measure the differential pressure that is ported from ports 105 to a differential pressure sensor mounted to the printed circuit board. The components on the printed circuit board assembly converts the differential pressure sensor analog signal to a digital message that is sent to the master controller 160. The pressure sensor data is used by an active load control algorithm that determines if the load mitigation device 150 shall deploy or retract the air deflector.

Another illustrative function may be to receive a digital message from the master controller 160 to purge ports A and B. The master controller processes the sensor data to determine if a possible port obstruction has occurred. If an obstruction is detected, the master controller sends a digital message to the local sensing device 130 to purge ports A and B. In addition, the master controller 160 send messages to purge ports A and B periodically, to keep the purge system clean.

Once the local sensing device 130 receives the digital message to purge, the purge sequence of events are commanded by the Local sensing device 130, the sequence is described in detail in section [43].

A further function may be to control the port temperature. This is done by thermostatic control of the resistive heating element. The temperature set point is sent from the master controller 160 to each local sensing device 130 via a digital message. Based on the set point, the resistive heater power is turned on and off by a controller or an autonomous thermostat installed on the local sensing device 130 printed circuit board 136 assembly.

During normal operation, the pressure ports 110 are connected directly to the pressure sensor through the manifold, valves and tubing. The differential pressure across the pressure sensor is proportional to local blade load. The positions of the pressure ports is such that the same mathematical relationship between differential pressure and local blade load holds throughout the operating range of the turbine, e.g. blade pitch and angle of attack. The output of the pressure sensor is a voltage that is converted to a pressure value in the data acquisition system.

Figure 5B:
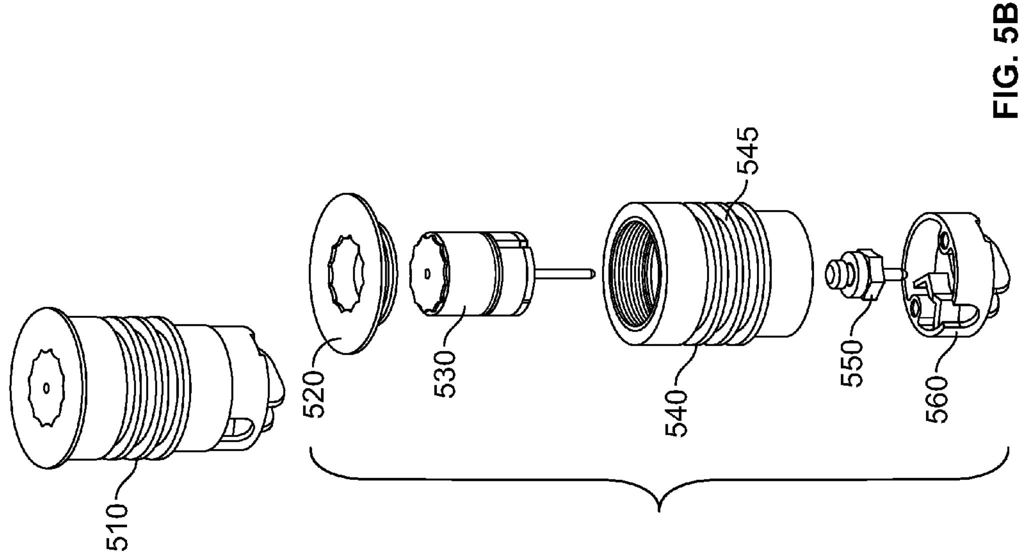
FIGS. 5A-5B are illustrative cross-sectional and exploded views of pressure ports.
Figure 5A:
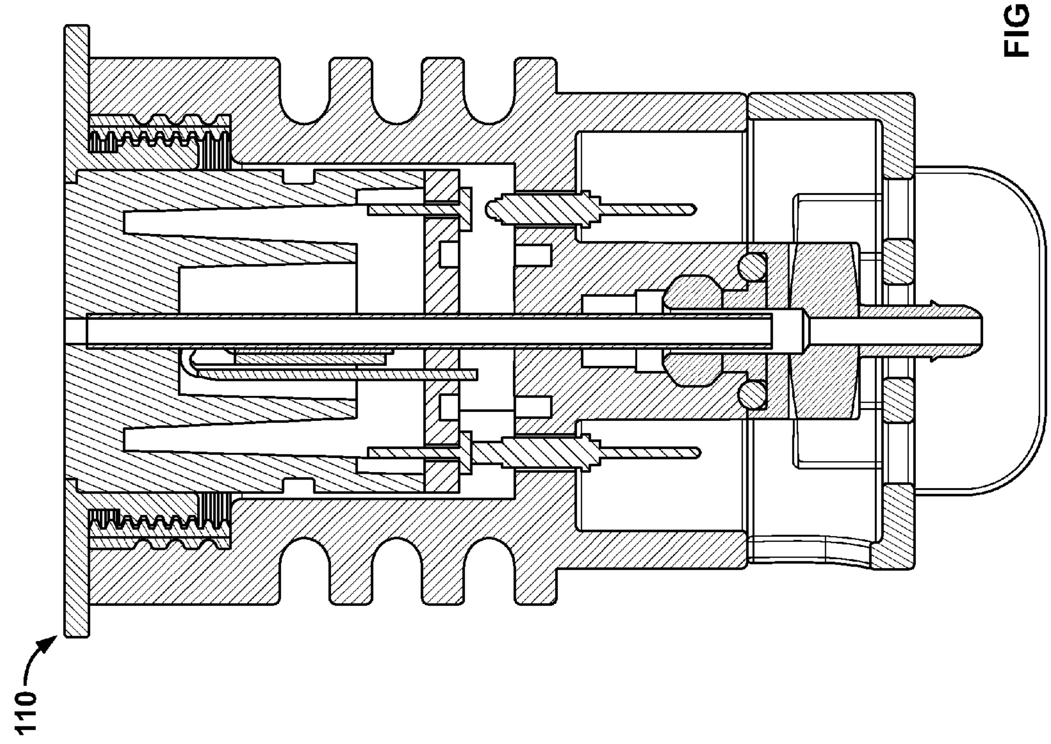

FIGS. 5A-5B are illustrative cross-sectional and exploded views of a pressure port 110. In FIG. 5A, an illustrative arrangement of the components of an illustrative pressure port 110 is apparent while FIG. 5B further illustrates some of the components that may make up the pressure port. Moving from the top down in FIG. 5B, first a port assembly 510—the region of the pressure port that typically sits closest or on the blade service in an orifice on the surface of the blade—is illustratively depicted. The top surface of port assembly 510 interacts with the exterior environment and is configured and formed to facilitate sensing and monitoring of air pressures and related characteristics that may vary and act on a turbine blade 10. A capture disk 520 sits below the port assembly 510 and above removable port core 530. In at least one configuration the capture disk may be metal while in at least one configuration the removable port core may be formed of a ceramic material. Below the removable port core 530 in the exploded view of FIG. 5B is shown port housing 540. Here, the port housing 540 is shown with press fit or over-molded threads 545. In at least one arrangement the port housing may be formed of nylon. Towards the bottom of the pressure port pneumatic fitting 550 is shown sitting above the locking cover 560. In at least one configuration the pneumatic figure may be formed of metal including stainless steel for example. The locking cover like the port housing may be formed of nylon or various other materials recognized by those skilled in the art. While an illustrative configuration of pressure port 110 is shown in FIGS. 5A-5B, other varied configurations are recognized by those skilled in the art. The pressure port is understood to include further components not specifically reference in FIGS. 5A-5B including heater components.

Figure 6:
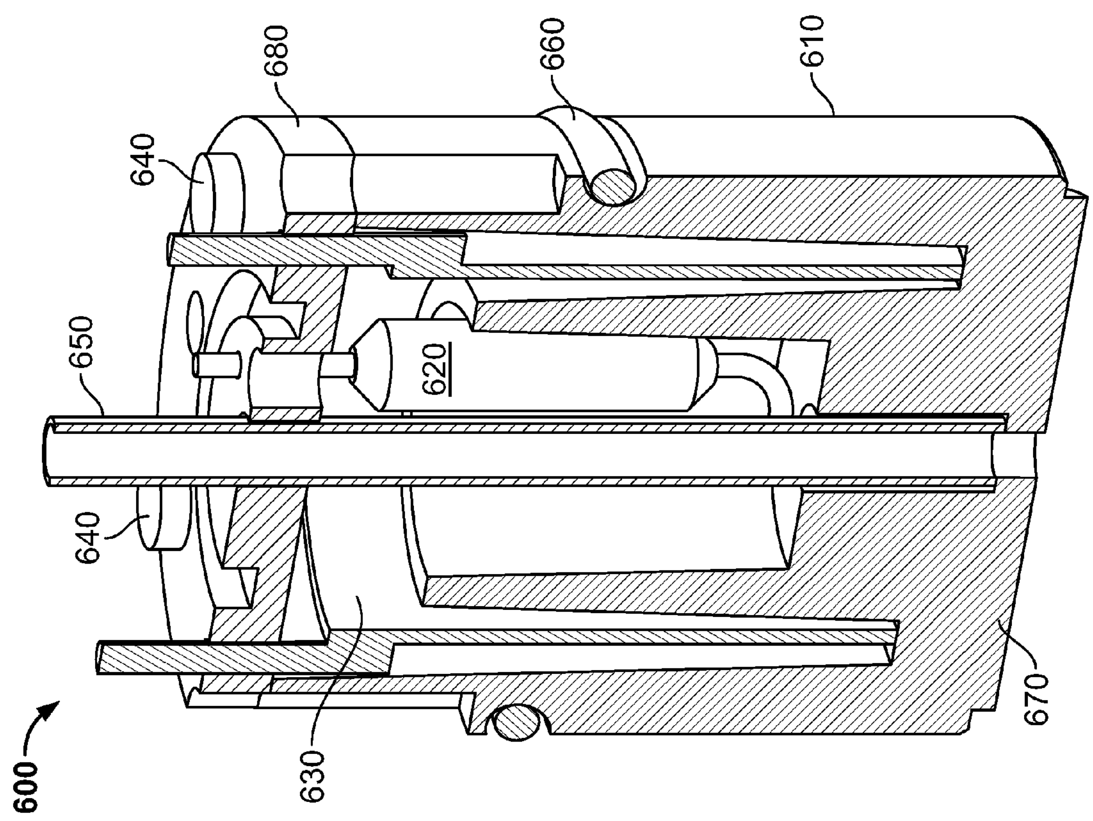
FIG. 6 is an illustrative cross-sectional view of a heater of a pressure port.

FIG. 6 is an illustrative cross-sectional view of a heater 600 of a pressure port 110. Using this heater 600 in the pressure port heat can be supplied to the external surroundings of the pressure point including the blade surface to melt ice and perform deicing. In at least one configuration as shown in FIGS. 6 and 7A the heater is configured to coil around the port tube to prevent ice formation among other things. The ceramic port assembly includes the resistive heating element or heater coil, a thermal fuse, a temperature sensor, and a tube. A thermally conductive potting compound is used to fill the internal port cavity. The potting compound conducts heat from the heater to the surface of the port melting ice that has formed on the surface of the blade over the port orifice.

The heater 600 illustratively shown in FIG. 6 may utilize a variety of materials and configurations to achieve desired results and heating and operation characteristics. For example, the heater may be a polymide film insulated heater id recognized to be able to formed into a variety of shapes sizes and wattages. Polymide film (e.g. Kapton®) Wattage ratings may be on the order 2.5, 5, or 10 W/in$^2$ at 115 or 28 V. Polyimide Film offers a high degree of resistance to chemicals, and has excellent outgasing properties in high vacuum environments. Typical construction may include an etched foil element of 0.0005" or 0.0001" thickness which is encapsulated between two layers of 0.002" Polyimide Film and 0.001" FEP adhesive, however, variability is recognized to fit desired usages. The heater may a significant range of operational temperatures including for example approximately −320° F. to 500° F. (−195° F. to 260° C.) in at least certain configurations. The heater 600 may also be formed of a variety of other materials as recognized by those skilled in the art including Teflon or Silicon. For example, leads as described below may be formed of Kapton, Silicon or Teflon. The heater may operate with a variety of characteristics and may include operation with a maximum resistance density of 100 Ω/in$^2$. The heater also may be formed to have a variety of sizes complimentary to the pressure port 110 size. For example, in one configuration heater 600 may have dimensions of 30 mm×13 mm but these dimensions may be considerably varied to fit the desired use an sensor system as is well known in the art. The thin, flat heaters in another configuration of heater 600 are approximately 5 mm in width and 30 mm in length. The heater is wrapped around the cylindrical port core along the long dimension and potted in place.

Several illustrative heater components are shown in FIG. 6. Heater 600 is shown in the arrangement of FIG. 6 as including a housing 610, thermal fuse 620, resistive heating element 630, contact pins 640, port tube 650, o-ring 660, and a port core 670. The o-ring 660 may provide a seal used to prevent water or debris from entering into the port housing that contains electrical contacts thereby preventing corrosion of the contacts. Also, in at least one configuration, the port core 670 may be formed of ceramic or other like materials. The port housing 610 material is thermally conductive, and conducts heat from the resistive heating element 630 to the surface of the port to melt ice that may form on or near the pressure sensing orifice. Thermal fuse 620 is located in-line with the heater circuit to ensure the port does not exceed a particular temperature (for our current design the rating of the thermal fuse is 115° C.). Since the ceramic core assembly is replaceable, height adjustable spring loaded contact pins were used to complete the electrical circuits to the resistive heating element 630. The spring loaded contact pins in the port receptor (999 in FIG. 9) were sized to ensure electrical continuity throughout the adjustable height range of the port, and mate with contact pins 640. The port tube 650 provides a path for air flow from the orifice to the pneumatic tubing connector. The O-ring 660 prevents external moisture from reaching the heater contact pins 640. A thermally conductive potting compound is used to fill the internal port core 670. The potting compound conducts heat from the heater to the surface of the port melting ice that has formed on the surface of the blade over the port orifice.

Figure 7B:
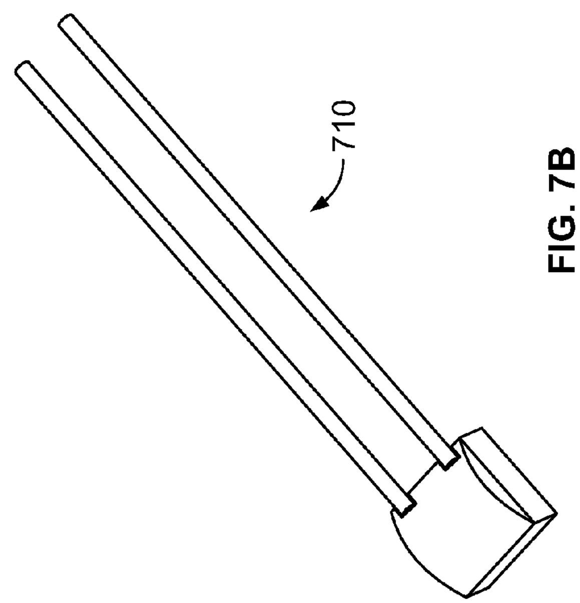
FIG. 7A is an illustrative cross-sectional view of a pressure port and FIG. 7B is an illustrative enlarged perspective view of a temperature sensor in the pressure port of FIG. 7A.
Figure 7A:
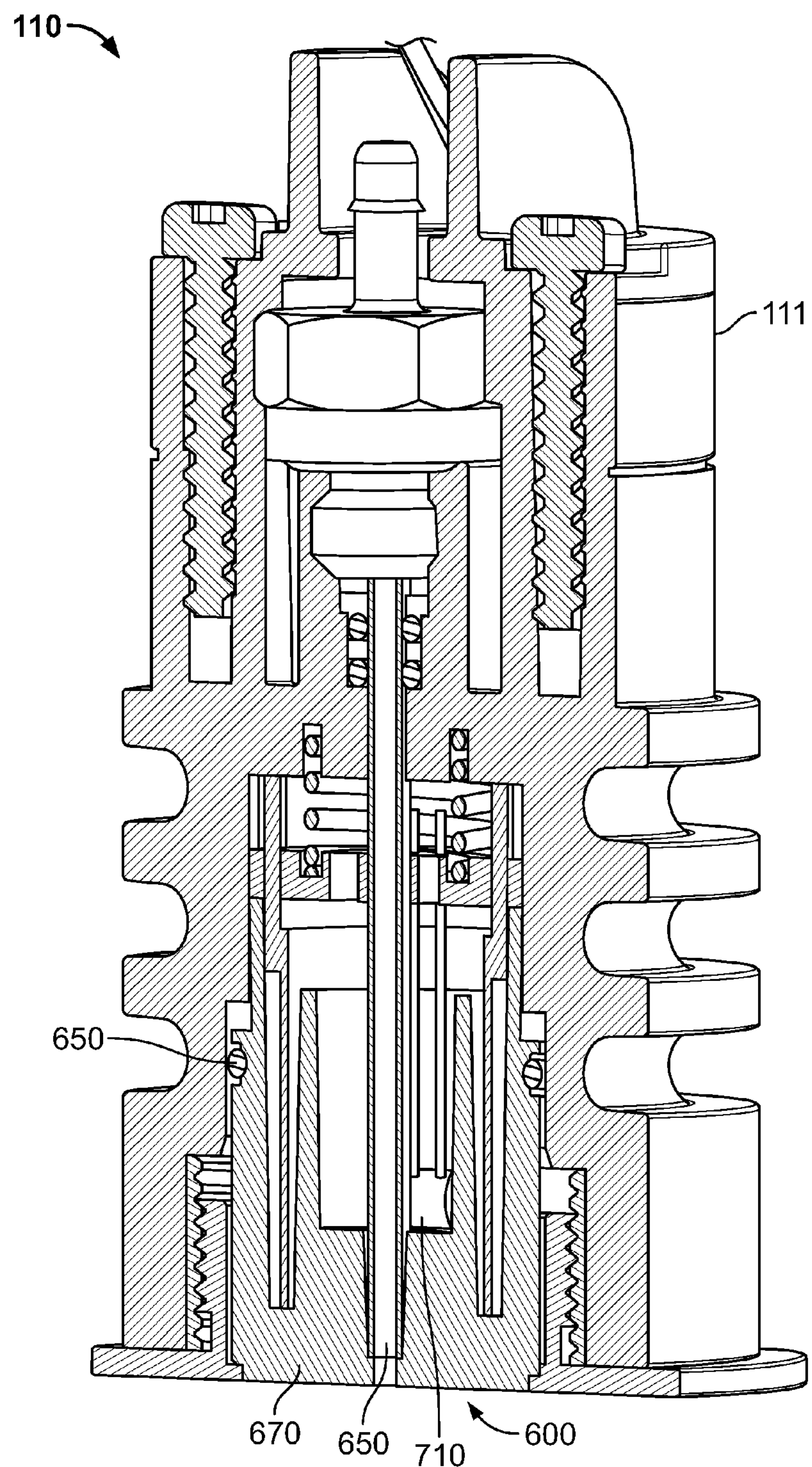

FIG. 7A is an illustrative cross-sectional view of a pressure port and FIG. 7B is an illustrative enlarged perspective view of a temperature sensor in the pressure port of FIG. 7A. In FIG. 7A the pressure port 110 is shown in an inverted orientation as compared to FIG. 6. As such, it is readily apparent how the heater 600 may be housed and otherwise orientated within the pressure port 110. FIG. 7B provides an enlarged view of temperature sensor 710 utilized in heater 600 as part of port 110. Temperature sensor 710 may be a variety of sensors including resistance temperature detectors or resistive thermal devices (RTDs). In the configuration shown in FIGS. 7A-7B may be a platinum RTD sensor or thermocouple. There are many manufacturers that make temperature sensors including platinum RTD sensors as known in the art. While the sensors may vary in size due to desired characteristics they may be made to be small enough to fit in a pressure port 110 and its integrated heater. One configuration of temperature sensors may have a width-length-height of the order of 2 mm×1 mm×1.2 mm. Many other dimension and configurations are known and considered. Further, the platinum temperature range of operation may be in the range of −50° C. to 500° C. and have an illustrative nominal resistance range of 1000Ω(Ohm). Again various other variations and configurations are recognized by those skilled in the art.

Figure 8:
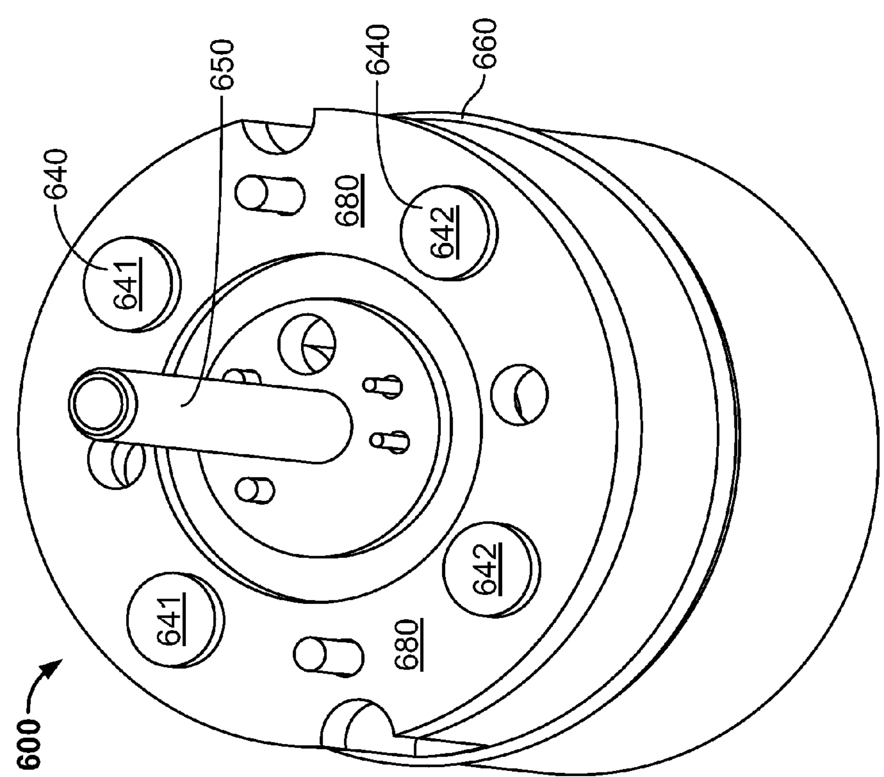
FIG. 8 is another illustrative arrangement of a heater of a pressure port.

FIG. 8 is another illustrative arrangement of a heater of a pressure port. In particular, FIG. 8 is an illustrative perspective demonstrating an arrangement of a heater 600 in which there a four (4) contact pins 640 housed in port end cap 680. In this arrangement two of the contact pins 614 are configured for use with the heater while two other contact pins are configured for use with the temperature sensor 710. The port end cap may be made from a variety of materials including ceramic, glass reinforced epoxy laminate sheets and other materials.

Figure 9:
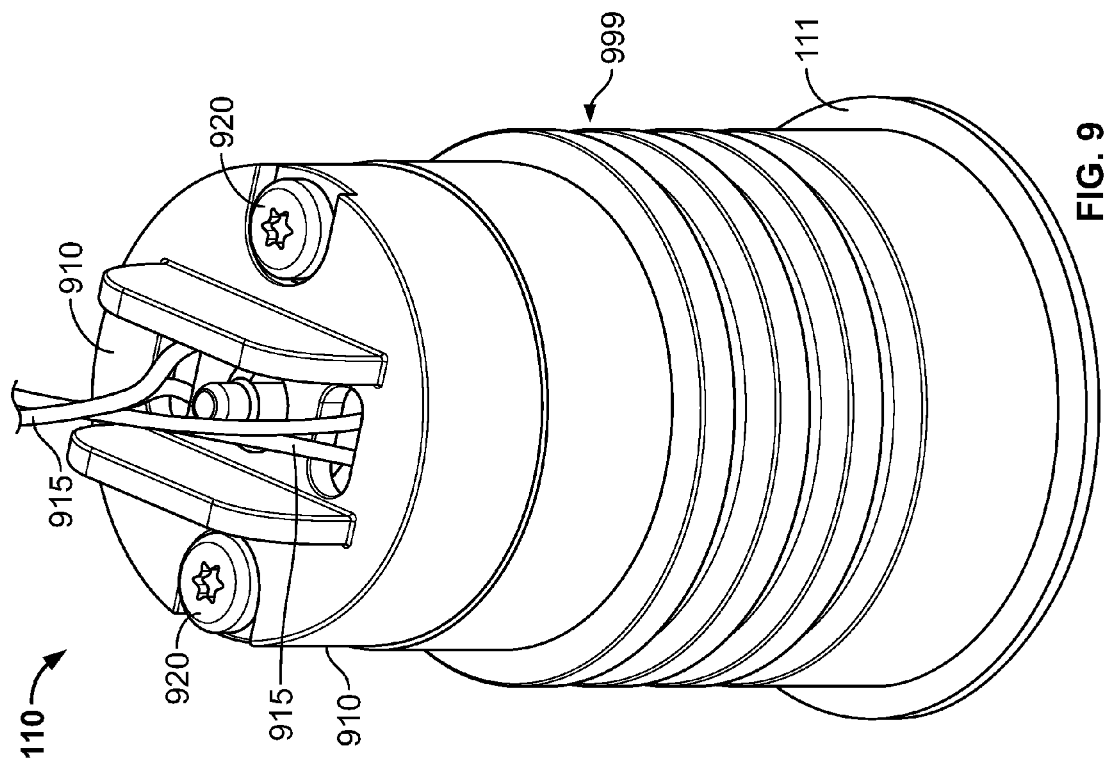
FIG. 9 is another illustrative arrangement of a pressure port

FIG. 9 is another illustrative arrangement of a pressure port 110 illustrating a modified configuration in which modified access holes 910 and securing members 920 that help secure the components of the port together within the locking cover 999 of pressure port 110. While access holes 910 may be formed in a variety of shapes in configurations, in at least one configuration they are formed as shown to allow access for additional wires 915.

In an illustrative arrangement of control circuitry (not shown) for a heater of pressure port 110 the circuitry may be referred to as Bang-Bang circuitry that regulates temperature is a similar fashion as how a thermostat might operate to regulate temperature. A simple autonomous analog circuit may heat pressure ports to 50° C. with <3° C. fluctuation at steady state in at least one configuration. Further, certain setpoints and calibration offsets are programmable with a digital resistor from the local sensing device 130. As such, the software coding associated with heater control is simplified as is event timing. Further, in certain configurations the need for external watchdog type circuitry may be obviated. As tested, the temperature in various arrangements may be accurate to approximately 4° C.—but may vary in certain configurations. In various configurations the heater control may be varied by position the temperature sensor 710 close to the heater coil and thereby shorten the delay and reduce overshoot as a result of heat transfer lag. Additionally, in other configurations a hysteresis resistor may be included to provide feedback on the comparator thereby removing noise in addition to a typical decoupling capacitor.

Figures 10A, 10B:
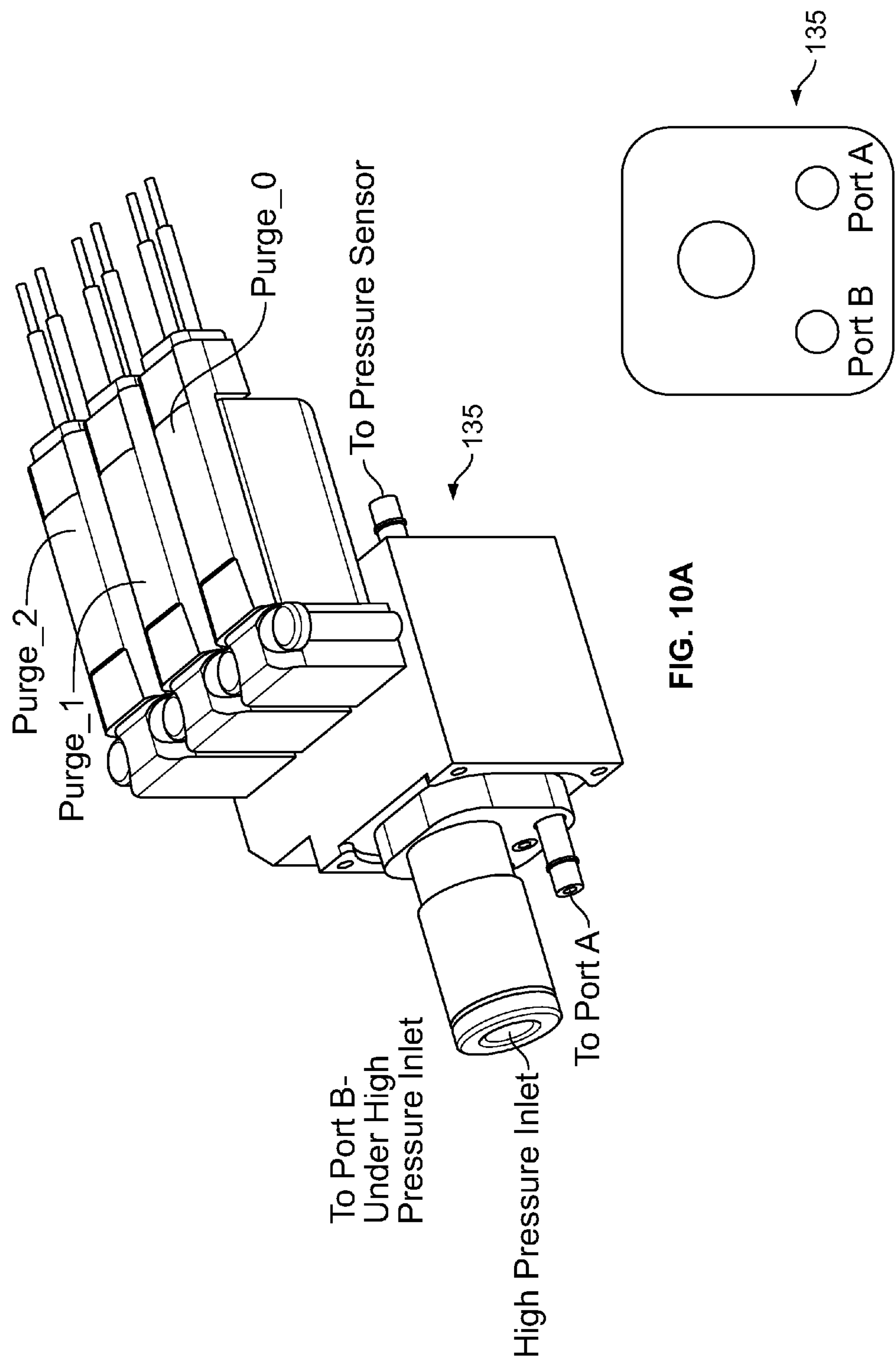
FIGS. 10A and 10B are illustrative perspective and front views respectively of a purge valve.
Figure 11A:
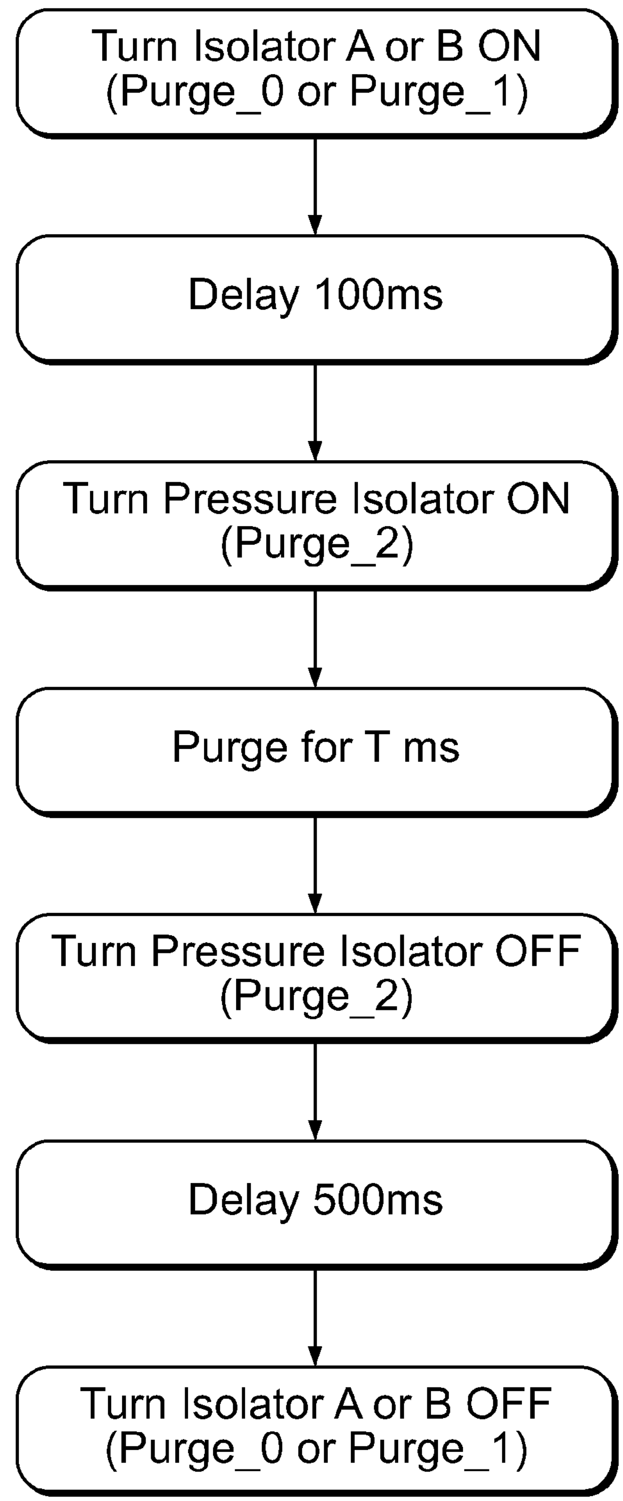
FIGS. 11A and 11B are illustrative flow chart and pneumatic schematic views respectively of pressure ports.
Figure 11B:
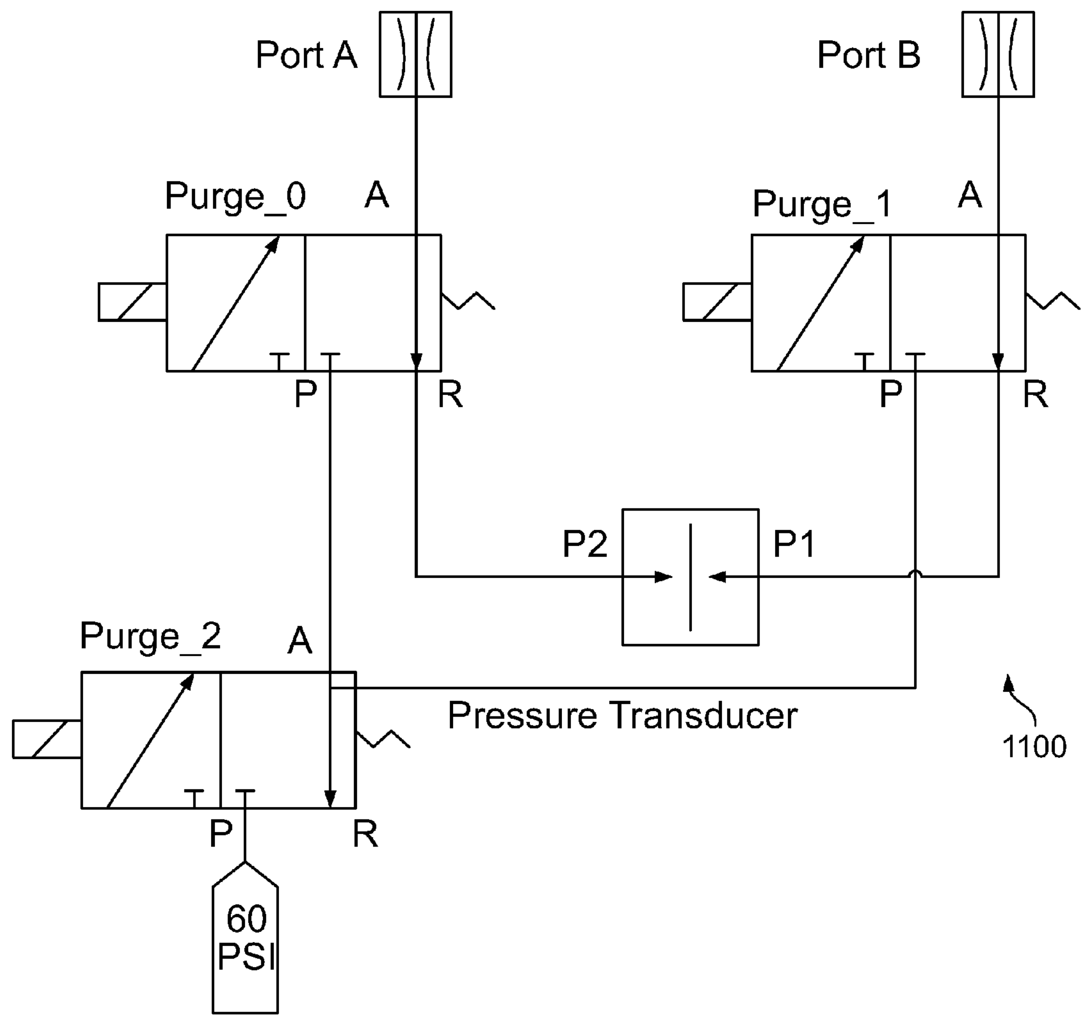

FIGS. 10A-10B illustratively depict a perspective and front schematic view of a purge valve while FIGS. 11A-11B illustratively depict a flow chart demonstrating one configuration of the purge process and a pneumatic schematic for pressure ports 110 in a wind turbine blade 10. During normal operation, the pressure ports are connected directly to the pressure sensor through the manifold, valves and tubing. For example, Port A is connected through valve Purge_0 to the P2 side of the differential pressure sensor. In the de-energized state, valves Purge_0 and Purge_1 connect their respective ports to the differential pressure sensor. Valve Purge_2 shuts off high pressure inlet air when de-energized. When a pressure port requires purging, either due to blockage or as a periodic proactive measure, the following sequence of events may occur in at least one configuration:

A three port, two position (3/2) valve (Purge_0 or Purge_1) is energized and repositions, disconnecting the pressure port to be purged (port A or port B, respectively) from the pressure sensor and connecting the pressure port to the high pressure air port (Purge_2).

After a 100 ms delay to ensure the first valve has repositioned, the high pressure isolation valve (Purge_2) repositions, connecting the high pressure air supply to the high pressure air port of the 3/2 valve connected to the pressure port to be purged.

High pressure air flows through the pressure port for a set period of time, dislodging any accumulated moisture or debris.

The high pressure isolation valve (Purge_2) is commanded to return to its normal position, shutting off the high pressure air supply.

After a 500 ms delay to ensure the high pressure isolation valve (Purge_2) has repositioned and high pressure air to the port has bled off, the port isolation valve (Purge_0 or Purge_1) returns to its normal position, reconnecting the pressure port to the pressure sensor and returning the pressure sensing subsystem to its normal configuration.

The pneumatic connectors to pressure sensing ports, Port A and Port B, as well as the high pressure air supply connector, are located on external face 1150 of the manifold.

FIG. 12 illustratively shows an overall arrangement of a local sensing module contained within the same housing as a load mitigation device, along with two pressure sensing ports 110 and associated power cabling and pneumatic tubing. The pressure sensing ports 110 are located on opposite sides of the wind turbine blade as described previously. All power and pneumatic connectors are located on the root end of the housing to minimize tensile strain on the cabling, tubing and connectors due to the effects of centripetal acceleration as the wind turbine rotor turns.

The steps for assembly and installation of an integrated load mitigation device including integrated load mitigation device 150/local sensing device 130 and ports 110, illustratively falls into the following categories: factory assembly of components; open-blade harness installation; and closed-blade component integration.

Load mitigation devices 150 with integrated local sensing device 130, the power/data distribution harness 1299, and the pressure sensing ports may be assembled in the factory and shipped to the customer location.

Tooling to create load mitigation device mounting pockets and mark port installation locations are placed at appropriate locations in the blade mold prior to blade fabrication.

During blade fabrication, the power/data distribution harness 1299 and the port power/pneumatic lines are laid out in one half of the open blade and fastened in place, with termination points at appropriate locations. The harness and port power/pneumatic may be fastened in place by laying fiberglass over the harness along their lengths.

After blade fabrication is completed, holes for the ports are drilled at the marked locations, the ports are connected to the power and pneumatic lines, and the ports are glued into the holes. Port height is modified as necessary to ensure that the surface of the port is flush with the aerodynamic surface of the blade.

Holes for nut inserts are drilled around the periphery of the load mitigation device mounting pockets, and nut inserts are glued in place. The load mitigation device, with attached faceplate, is connected to the power/data distribution harness and placed in the mounting pocket, with a compliant gasket between the faceplate and the blade material. The faceplate is then fastened to the nut inserts in the mounting pockets. Any areas on or around the faceplate surface that are not flush with the aerodynamic surface of the blade, such as the mounting holes, are filled in with an appropriate material to produce a smooth aerodynamic surface.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A sensing module for a wind turbine blade comprising:

a plurality of ports;

a local sensing device including a sensor portion and a component, different from the sensor portion, configured to remove an obstruction to sensing operation of the local sensing device;

a load mitigation device, wherein the local sensing device and load mitigation device are included in a single unit, the single unit further including an air deflection member configured to extend beyond a surface of the wind turbine blade thereby causing a change in an air pressure difference on the surface of the blade; and a controller operably coupled to the local sensing device and the load mitigation device, wherein the controller is configured to:

monitor air pressure;

determine if proper sensing operation is occurring; and cause the component of the local sensing device to remove the obstruction upon determining that proper sensing operation is not occurring.

2. The sensing module for a wind turbine blade of claim 1, wherein the component configured to remove an obstruction to sensing operation of the local sensing device includes a heater, a pressurized air component or a combination thereof.

3. The sensing module for a wind turbine blade of claim 2, further comprising a plurality of single units each including a local sensing device and load mitigation device integrally housed as part of the single unit and operably coupled to a pair of ports.

4. The sensing module for a wind turbine blade of claim 1, wherein the component configured to remove the obstruction to the sensing operation of the local sensing device includes a heater configured to perform deicing of a port surface on the turbine blade when activated.

5. The sensing module for a wind turbine blade of claim 4, wherein the heater includes a thermocouple.

6. The sensing module for a wind turbine blade of claim 4, wherein the heater includes a resistive temperature sensor.

7. The sensing module for a wind turbine blade of claim 6, wherein each of the plurality of ports includes a ceramic port core that houses the heater and the resistive temperature sensor.

8. The sensing module for a wind turbine blade of claim 4, wherein the heater is operably coupled to and controlled by the controller.

9. The sensing module for a wind turbine blade of claim 8, wherein the controller is a bang-bang circuit.

10. A wind turbine comprising:

a plurality of blades operably connected around a turbine hub; and a sensing system configured to monitor air pressure on the turbine blades and including a plurality of sensor modules being housed in each turbine blade and a control module housed in the hub, the sensor modules each including a plurality of pressure ports, a local sensing device and a load mitigation device, the local sensing device and the load mitigation device being disposed in a single unit, and the control module including a controller and a dry air system, wherein the sensing system is an active sensing system configured to determine if proper sensing operation is being prevented and to actively eradicate an obstruction that is preventing proper sensing operation from the wind turbine using pressurized air from the dry air system.

11. The wind turbine of claim 10, wherein the load mitigation device within the single unit includes an air deflection member capable of being positioned in a protruded state and a retracted state so as to mitigate air pressure loads on a turbine blade on which the sensing module is housed.

12. The wind turbine of claim 11, wherein the wind turbine is a variable blade length wind turbine.

13. A method for monitoring wind turbine blade operation with an active sensing system including a local sensing device and a load mitigation device, comprising the steps of:

monitoring operational characteristics of a turbine blade including detecting air pressure on a surface of a turbine blade by detecting differences in air pressure measure at a first and a second pressure port of a complimentary pair of pressure ports housed and spaced on the turbine blade;

detecting an error in monitoring of the operational characteristics of the turbine blade;

causing the sensing system to perform an eradicating action to eradicate a portion of an obstruction on the turbine blade using an obstruction removal component of the sensing system different from a sensor portion of the local sensing device;

determining a pressure difference detected by a pair of pressure ports exceeds a first predetermined value; and protruding an air deflection member beyond a surface of the turbine blade to cause the pressure difference to be reduced.

14. The method for monitoring wind turbine blade operation with an active sensing system of claim 13, further comprising the steps of:

determining the pressure difference detected by the pair of pressure ports is below a second predetermined value; and retracting an air deflection member below a surface of the turbine blade upon determination that the pressure difference detected is below the second predetermined value.

15. The method for monitoring wind turbine blade operation with an active sensing system of claim 14, wherein the first predetermined value and the second predetermined value are the same value.

16. The method for monitoring wind turbine blade operation with an active sensing system of claim 14, wherein the eradicating action is performed simultaneously at a plurality of ports.

17. The method for monitoring wind turbine blade operation with an active sensing system of claim 16, wherein the obstruction removal component includes a heating element and a pressurized air element and wherein the eradicating action includes supplying both heat and pressurized air at the first pressure port.

18. The method for monitoring wind turbine blade operation with an active sensing system of claim 13, wherein the obstruction removal component includes a heating element and a pressurized air element and wherein the eradicating action includes supplying heat to a first port simultaneously with supplying pressurized air to a second port.

* * * * *